(12) United States Patent
Hargis et al.

(10) Patent No.: US 7,171,534 B2
(45) Date of Patent: Jan. 30, 2007

(54) SYSTEM AND METHOD FOR MULTI-MODAL MEMORY CONTROLLER SYSTEM OPERATION

(75) Inventors: Jeff G. Hargis, Fort Collins, CO (US); George Thomas Letey, Boulder, CO (US); Michael Kennard Tayler, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/016,121

(22) Filed: Dec. 17, 2004

(65) Prior Publication Data

US 2005/0108463 A1    May 19, 2005

Related U.S. Application Data

(63) Continuation of application No. 10/189,839, filed on Jul. 5, 2002, now Pat. No. 6,854,043.

(51) Int. Cl.
*G06F 12/00* (2006.01)

(52) U.S. Cl. ...................... 711/168; 711/105

(58) Field of Classification Search ................ 711/168, 711/105, 148, 149, 150, 153, 156; 365/230.03
See application file for complete search history.

(56) References Cited

U.S. PATENT DOCUMENTS

| | | | | |
|---|---|---|---|---|
| 6,049,855 | A * | 4/2000 | Jeddeloh ...................... | 711/157 |
| 6,279,078 | B1 * | 8/2001 | Sicola et al. ................. | 711/119 |
| 6,622,225 | B1 * | 9/2003 | Kessler et al. ............... | 711/158 |
| 6,636,935 | B1 * | 10/2003 | Ware et al. .................... | 711/5 |
| 6,854,043 | B2 * | 2/2005 | Hargis et al. ................ | 711/168 |

* cited by examiner

*Primary Examiner*—Hiep T. Nguyen

(57) ABSTRACT

A memory controller system for processing memory access requests comprising a first memory controller operable to address a first plurality of memory modules a second memory controller operable to address a second plurality of memory modules, the first and second memory controllers configurable to process a memory transaction in an operational mode of the memory controller system selected from the group consisting of an independent cell mode, a multiplexer-mode (mux-mode), and a lockstep mode, and a bus interface block operable to convey the memory transaction to both of the first and second memory controllers is provided.

26 Claims, 6 Drawing Sheets

FIG. 5

| MCCTRL_0 CLK1<br>cell0 b0(1)$_0$ | MCCTRL_0 CLK0<br>cell0 b0(0)$_0$ | 330A$_0$ |
|---|---|---|
| cell0 b0(1)$_1$ | cell0 b0(0)$_1$ | 330A$_1$ |
| ⋮ | ⋮ | |
| cell0 b0(1)$_{70}$ | cell0 b0(0)$_{70}$ | 330A$_{70}$ |
| cell0 b0(1)$_{71}$ | cell0 b0(0)$_{71}$ | 330A$_{71}$ |
| cell0 b0(1)$_{72}$ | cell0 b0(0)$_{72}$ | 331A$_0$ |
| cell0 b0(1)$_{73}$ | cell0 b0(0)$_{73}$ | 331A$_1$ |
| ⋮ | ⋮ | |
| cell0 b0(1)$_{142}$ | cell0 b0(0)$_{142}$ | 331A$_{70}$ |
| cell0 b0(1)$_{143}$ | cell0 b0(0)$_{143}$ | 331A$_{71}$ |
| MCCTRL_1 CLK1<br>cell_1 b1(1)$_0$ | MCCTRL_1 CLK0<br>cell_1 b1(0)$_0$ | 330B$_0$ |
| cell_1 b1(1)$_1$ | cell_1 b1(0)$_1$ | 330B$_1$ |
| ⋮ | ⋮ | |
| cell_1 b1(1)$_{70}$ | cell_1 b1(0)$_{70}$ | 330B$_{70}$ |
| cell_1 b1(1)$_{71}$ | cell_1 b1(0)$_{71}$ | 330B$_{71}$ |
| cell_1 b1(1)$_{72}$ | cell_1 b1(0)$_{72}$ | 331B$_0$ |
| cell_1 b1(1)$_{73}$ | cell_1 b1(0)$_{73}$ | 331B$_1$ |
| ⋮ | ⋮ | |
| cell_1 b1(1)$_{142}$ | cell_1 b1(0)$_{142}$ | 331B$_{70}$ |
| cell_1 b1(1)$_{143}$ | cell_1 b1(0)$_{143}$ | 331B$_{71}$ |

320A brackets rows 330A$_0$–331A$_{71}$; 320B brackets rows 330B$_0$–331B$_{71}$.

SYSTEM AND METHOD FOR MULTI-MODAL MEMORY CONTROLLER SYSTEM OPERATION

RELATED APPLICATIONS

This application is a continuation of U.S. patent application Ser. No. 10/189,839, filed Jul. 5, 2002, now U.S. Pat. No. 6,854,043 entitled "SYSTEM AND METHOD FOR MULTI-MODAL MEMORY CONTROLLER SYSTEM OPERATION."

TECHNICAL FIELD OF THE INVENTION

This invention relates to memory controller technologies and, more particularly, to a system and method for a multi-modal memory controller system.

BACKGROUND OF THE INVENTION

Memory controllers field and execute memory access requests, for example requests to read data from, and write data to, a plurality of memory modules. A memory access request may be initiated by either a central processing unit (CPU) or an input/output (I/O) device.

A conventional memory controller system can be directly coupled with a plurality of memory modules for access thereto in a direct attach mode. In such a configuration, memory modules may be added in pairs and, accordingly, memory replacement costs are minimized. However, system bandwidth and latency issues are not optimized in a conventional direct attach procedure because as many as eight data transfers must be performed on the memory modules in order for the memory controller system to execute a cache line transaction.

An enhanced memory controller system attach is provided by a conventional mux-mode attach configuration in which the memory controller system attaches to an intermediate chip that is coupled with a plurality of memory modules. In such a configuration, a double-speed bus interconnects the intermediate chip with the memory controller system and dual single-speed memory buses interconnect a plurality of memory modules with the intermediate chip. Accordingly, double width data transfers are made between the intermediate chip and the memory modules and the intermediate chip may merge the data onto the double-speed bus so that the memory controller system may execute a cache line transaction by executing ½ the number of data bursts required in a direct attach system. System latency and bandwidth are thus optimized.

SUMMARY OF THE INVENTION

Heretofore, a memory controller system comprising two distinct memory controller units (or cells) configurable in independent or lockstep direct attach modes or in a high bandwidth mux attach mode of operation has not been provided.

In accordance with an embodiment of the present invention, a memory controller system for processing memory access requests comprising a first memory controller operable to address a first plurality of memory modules, a second memory controller operable to address a second plurality of memory modules, the first and second memory controllers configurable to process a memory transaction in an operational mode of the memory controller system selected from the group consisting of an independent cell mode, a multi-plexer-mode (mux-mode), and a lockstep mode, and a bus interface block operable to convey the memory transaction to both of the first and second memory controllers is provided.

In accordance with another embodiment of the present invention, a method of processing a memory access request in a memory controller system comprising receiving, by the memory control system, a memory transaction, conveying the memory transaction to each of a first memory controller and a second memory controller, issuing, by the first memory controller, a memory command to a plurality of memory modules coupled with the first memory controller, and issuing, by the second memory controller, a memory command to a plurality of memory modules coupled with the second memory controller, wherein the issuing of the memory commands by the first and second memory controllers are performed in synchronization is provided.

In accordance with another embodiment of the present invention, a method of configuring a memory controller system, comprising indicating selection of a lockstep mode of the controller system, and transferring, to a first and second memory controller, configuration data writes addressed to a configuration register set of the first memory controller is provided.

BRIEF DESCRIPTION OF THE DRAWINGS

For a more complete understanding of the present invention, the objects and advantages thereof, reference is now made to the following descriptions taken in connection with the accompanying drawings in which:

FIG. 5 is a diagrammatic schematic of data transfers from memory modules to a memory controller data block of the memory controller system described with reference to FIG. 4;

DETAILED DESCRIPTION OF THE DRAWINGS

The preferred embodiment of the present invention and its advantages are best understood by referring to FIGS. 1 through 8 of the drawings, like numerals being used for like and corresponding parts of the various drawings.

Figure 1:
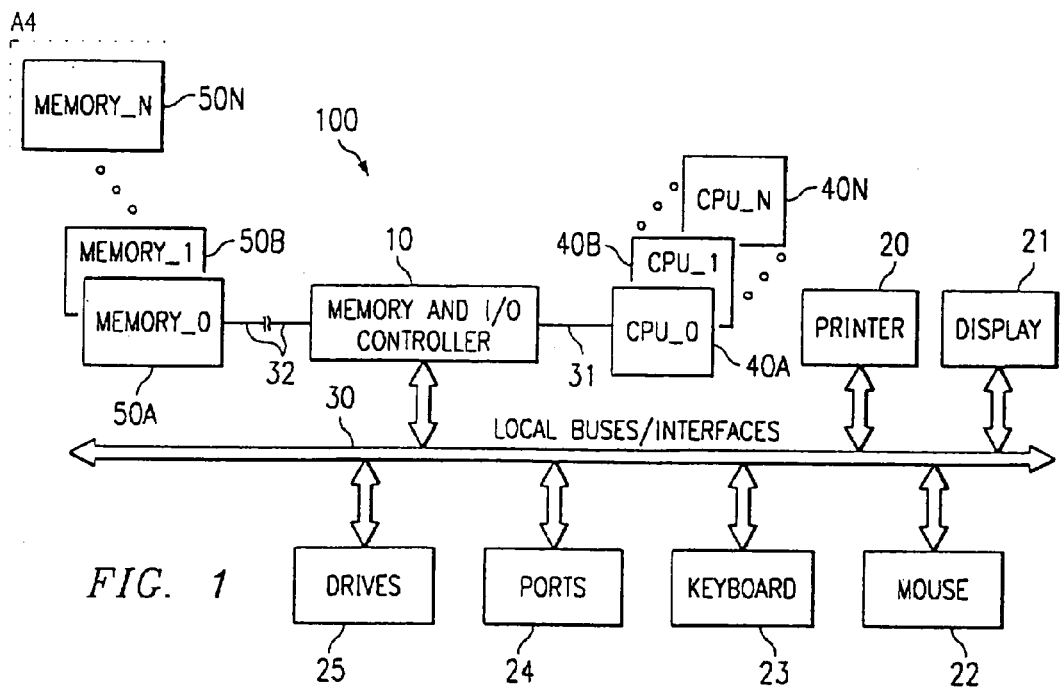
FIG. 1 is a simplified block diagram of a computer system having a memory controller system that may form part of an integrated memory and input/output controller in which the present invention may be employed to advantage.

FIG. 1 is a simplified block diagram of a computer system 100 having a memory controller system that may form part of an integrated memory and input/output (I/O) controller (MIOC) 10 in which the present invention may be employed to advantage. MIOC 10 may be a double data rate (DDR) memory controller capable of communicating with DDR synchronous dynamic random access memories (SDRAMs), but need not be.

Computer system 100 comprises one or more central processing units 40A–40N connected to MIOC 10 via a system bus 31. MIOC 10 receives access requests over system bus 31 and addresses memory modules 50A–50N and/or other I/O devices, for example a printer 20, a display 21, input devices such as a mouse 22 or keyboard 23, I/O ports 24, and storage devices 25, operatively coupled with MIOC 10 via a local interface 30, such as one or more system buses (e.g. a peripheral component interconnect (PCI) local bus, an integrated device electronics (IDE) interface, or another suitable interface), in order to process memory access requests. Fetched data is then returned as necessary. Inbound memory access requests received from I/O devices 20–24 my also be processed by MIOC 10. Memory and I/O access requests typically comprise read requests and write requests. MIOC 10 is coupled to a plurality of memory modules 50A–50N over a memory bus 32. Memory modules 50A–50N may comprise, for example, a number of DDR Dual In-Line Memory Modules (DIMMs). A DIMM is a fixed data width (typically 64 or 72 bits) collection of random access memory (RAM) devices.

Figure 2:
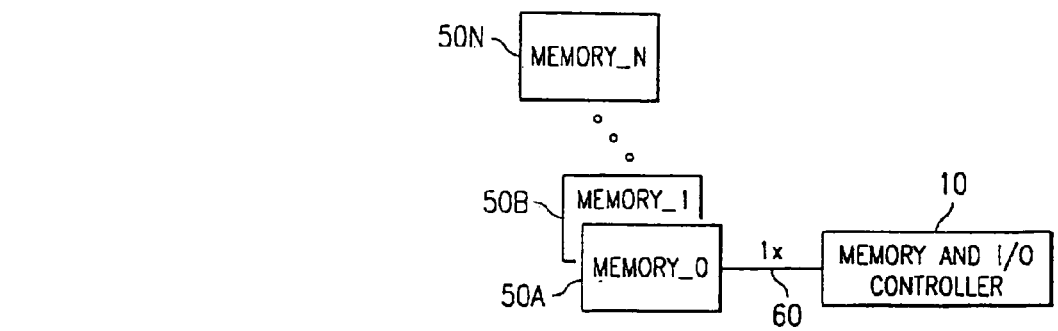
FIG. 2 is an illustrative schematic of a configuration for connecting memory modules to a memory and input/output controller in a direct attach scheme via a standard speed (1×) bus according to the prior art.
Figure 3:
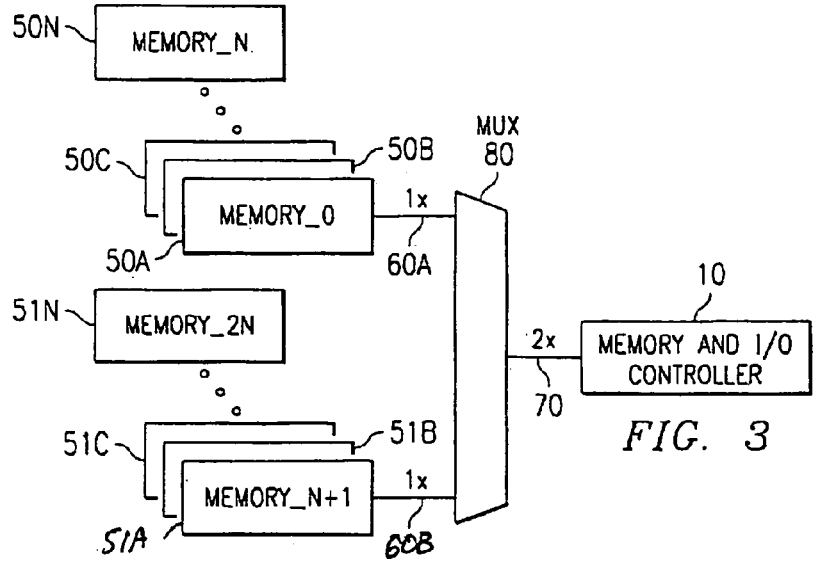
FIG. 3 is an simplified schematic of a configuration for connecting memory modules to a memory and input/output controller in a mux-mode attach for facilitating double-speed (2×) read and/or writes to memory modules according to the prior art.

In FIG. 2, there is an illustrative schematic of a conventional configuration for connecting memory modules 50A–50N to MIOC 10 in a direct attach scheme via a 1× bus 60, for example a 1× DDR bus. As defined herein, a 1× bus 60 is a memory bus which operates in conventional-DDR mode, wherein data is transmitted in synchronization with both edges of a strobe signal. DDR SDRAM devices are available in various data widths, such as 4, 8 and 16 bits. A 4-bit wide DDR SDRAM is known as a ×4 DDR SDRAM and is characterized by its generation/receipt of four data signals in response to a single strobe signal. Likewise, an 8-bit wide DDR SDRAM and a 16-bit wide DDR SDRAM are respectively characterized by the generation/receipt of eight and 16 data signals in response to a single strobe signal. Memory modules are available in a variety of configurations other than dual-inline configurations, such as Single In-Line Memory module (SIMM), small outline DIMM (SO-DIMM), and other configurations. The description of memory modules herein is exemplary only and it should be understood that the present invention is not limited to any particular configuration of memory modules. Similarly, RAM devices may assume a variety of configurations and the choice of DDR SDRAM devices is only to facilitate an understanding of the invention.

Returning to FIG. 2, memory controller 10 may directly attach to a plurality of memory modules 50A–50N. For example, assuming MIOC 10 is a 144-bit memory controller and memory modules 50A–50N are 72-bit SDRAM DIMMs, MIOC 10 may, at any particular time, directly access two of memory modules 50A–50N. An alternative attach scheme may be performed by MIOC 10 to facilitate 2× read and/or writes to memory modules 50A–50N, as shown by the simplified schematic of FIG. 3. In the attach mode shown in FIG. 3, MIOC 10 attaches to one or more intermediate chips 80, such as a multiplexer circuit, via a bus 70 that operates at an M× (2× in the illustrative example) speed. The exemplary arrangement utilizes a multiplexer circuit as the intermediate chip and the attach scheme is thus referred to as a mux mode. In mux-mode, reads and writes between MIOC 10 and intermediate chips 80 occur at a 2× rate. However, reads and writes between intermediate chips 80 and memory modules 50A–50N occur at a 1× rate over respective memory buses 60A and 60B Each of memory buses 60A and 60B are coupled with respective memory modules 50A–50N and 51A–51N. The advantage of using intermediate chip(s) 80 is that one can double a system's memory capacity by: 1) using intermediate chip(s) 80 to receive 2× data and then distribute the 2× data in a 1× fashion to two banks of memory modules, or 2) using the intermediate chips 80 to receive 1× data from two banks of memory modules and multiplex the data to provide it to MIOC at a 2× rate. It should be apparent that use of intermediate chips 80 also doubles a memory system's bandwidth.

Figure 4A:
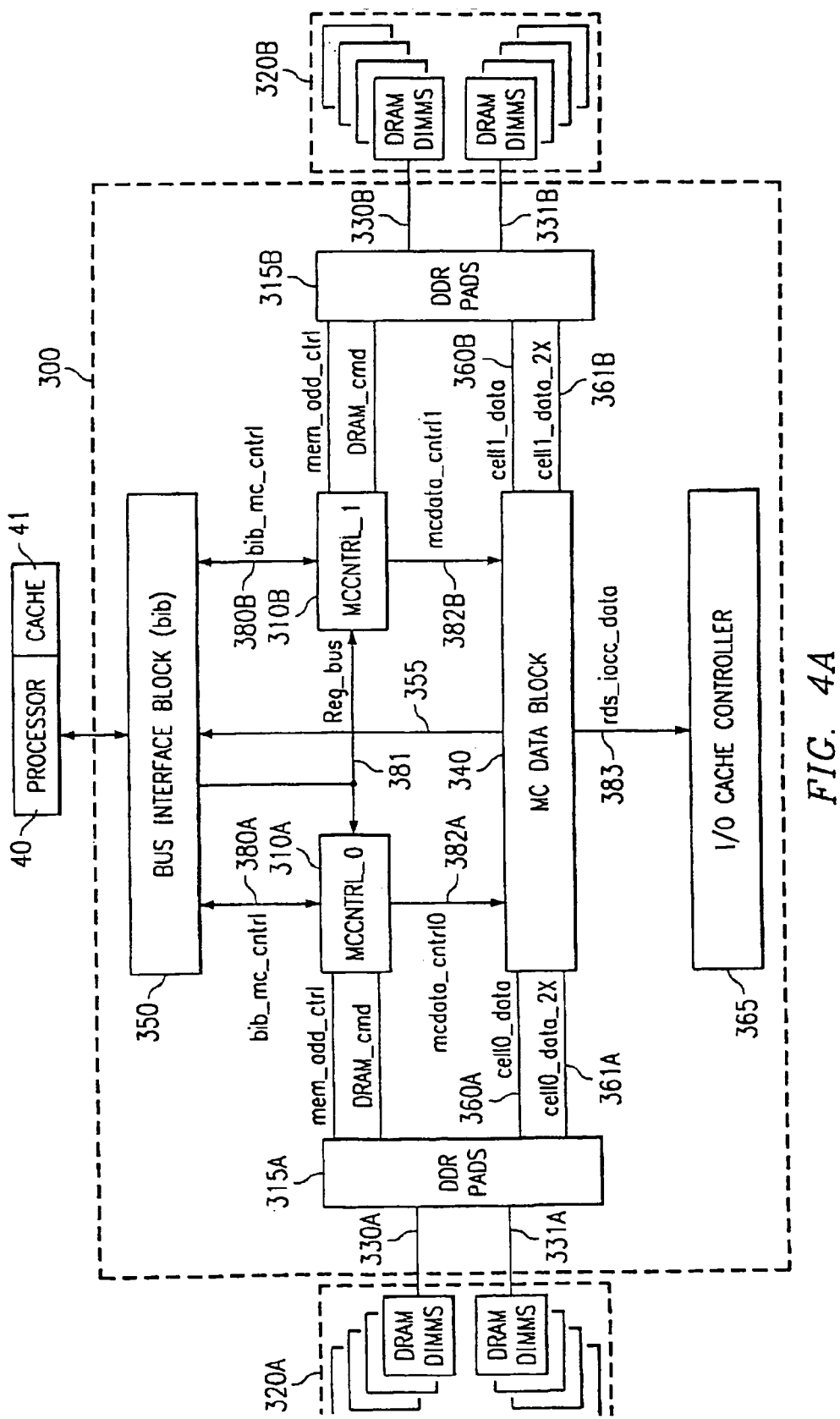
FIG. 4A is a simplified schematic of an embodiment of a memory control system that may be configured to operate in one of multiple modes of operation according to the present invention.

In FIG. 4A, there is a simplified block diagram of a memory controller system 300 that may be configured to operate in one of multiple modes of operation according to an embodiment of the present invention. Memory controller system 300 comprises two controllers 310A (MCCTRL_0) and 310B (MCCTRL_1) that may respectively interface with memory modules 320A and 320B, such as DRAM DIMMs, via memory buses 330A–331A and 330B–331B. In the illustrative example, memory buses 330A–331B each respectively represent a 72 bit bi-directional bus and electrically couple memory modules 320A with DDR pads 315A and memory modules 320B with DDR pads 315B. Memory modules 320A and 320B are preferably implemented as double data rate DRAM DIMMs but other memory module configurations may be substituted therefor. Memory controllers 310A and 310B are also coupled with memory modules 320A and 320B with an address bus and control lines (mem_addr_ctrl). The present invention enables memory controllers 310A and 310B to attach to respective memory modules 320A and 320B in a direct attach mode independently of one another (referred to herein as an Independent Cell Mode of operation) or, alternatively, to conjunctively operate in a 'lockstep' mode of operation. Additionally, a mux attach mode of operation may be performed by the memory controller system 300 when memory controllers 310A and 310B independently operate as described hereinbelow with reference to FIG. 4B.

One or more central processing units 40 interface with memory controller system 300 via a bus interface block (bib) 350 that is coupled with both memory controllers 310A and 310B. Bus interface block 350 may pass and receive control data and memory transaction data (bib_mc_cntrl) to each of memory controllers 310A and 310B via lines 380A and 380B, respectively, and is commonly interconnected with both memory controllers 310A and 310B via a system configuration bus (Reg_bus) 381 operable to facilitate delivery of programmable configuration register read and write commands to respective configuration registers of memory controllers 310A and 310B. Each of memory controllers 310A and 310B interface with a memory controller (MC) data block 340 and may pass respective control data mcdata_cntr10 and mcdata_cntr11 by control lines 382A and 382B to MC data block 340. MC data block 340 is electrically coupled with DDR pads 315A and 315B via respective data buses 360A–361A and 360B–361B and with an input/ output (I/O) cache controller (IOCC) 365 via rds_iocc_data line 383. In the illustrative example, each of data buses 360A–361B is a 144-bit data bus. In the illustrative example, it is useful to note that the DDR data buses 330A–331B transfer data on every transition (or edge) of the clock, but operate at ½ the clock frequency of memory controller 300. Thus one memory controller system 300 clock cycle is equivalent to one DDR bus 330A–330B clock edge. As used herein, a clock cycle refers to a single memory controller system 300 clock cycle unless specified otherwise.

When memory controller system 300 is configured to operate in independent cell mode (ICM), each memory controller 310A and 310B independently addresses respective memory modules 320A and 320B. A memory transaction issued by IOCC 365 or processor 40 interconnected with bus interface block 350 is accepted by either memory controller 310A or 310B, but not both, when operating in ICM. That is, a memory transaction received at bus interface block 350 is conveyed to each of memory controllers 310A and 310B but is only accepted for processing by one of memory controllers 310A and 310B when memory controller system 300 is configured in either ICM or mux-mode. Memory modules 320A, accordingly, provide a first addressable space that may be subject to memory transactions issued by IOCC 365 or processor 40 and memory modules 320B provide a second addressable space that may be subject to memory transactions issued by IOCC 365 or processor 40 in ICM mode (and mux-mode as well). The address spaces provided by memory modules 320A and 320B are defined by respective memory bank address tables of memory controllers 310A and 310B that map respective physical address ranges to memory spaces provided by modules 320A and 320B. The logical mapping of memory addresses to memory modules 320A and 320B provided by the respective memory bank address tables are mutually exclusive when memory controller system 300 is configured to operate in ICM or mux-mode and thus a memory transaction conveyed to each of memory controllers 310A and 310B may only map to one of memory modules 320A and 320B during operation of memory controller system 300 in either of ICM and mux-modes. Thus, a memory transaction conveyed to each of memory controllers 310A and 310B is only "accepted" by one of memory controllers 310A and 310B in either independent mode of operation. These addressable spaces provided by memory modules 320A and 320B may be interleaved using a variety of interleaving algorithms for more efficient system operation. In the illustrative example, memory controller 310A receives, accepts, and processes transactions directed to any memory address space provided by modules 320A, and memory controller 310B receives, accepts, and processes memory transactions directed to any memory address space provided by modules 320B. In the configuration shown, a one-clock cycle data read from memory modules 320A comprises transfer of 72 bits from memory modules 320A via memory bus 330A and 72 bits via memory bus 331A to MC data block 340 via DDR pads 315A and bus 360A. Each of the 72-bit transfers to pads 315A via memory buses 330A and 331A are collectively transferred to MC data block 340 as a 144-bit one-clock cycle data read (cell0_data) over bus 360A. Similarly, a one-clock cycle data read from memory modules 320B comprises passing 72 bits from memory modules 320B via memory bus 330B and 72 bits via memory bus 331B. Bus 360B conveys the 144-bits (cell1_data) of the one-clock cycle read via DDR pads 315B to MC data block 340. Thus, a 288-bit data transfer performed on memory module 320A requires two memory controller 310A clock cycles and a 288-bit data transfer performed on memory module 320B requires two memory controller 310B clock cycles when memory controller system 300 operates in ICM.

MC data block 340 comprises a read data storage (RDS) and a write data storage (WDS) that perform data transfers in 288-bit word sizes. In the illustrative example, bus interface block 350 performs full cache line data transactions of four 288-bit words to a memory cache system 41 of processor 40. Thus, a full cache line write to processor 40 requires 4 consecutive ¼ cache line data words because the smallest data transfer that may be performed by the RDS and WDS is a 288-bit transfer. In ICM mode of operation, two consecutive data transfers (read or write) must be performed on memory module 320A or 320B for each ¼ cache line as a ¼ cache line data transfer requires 288-bits from one of the address spaces provided by memory modules 320A and 320B. Thus, each full cache line transaction (read or write) requires eight total data transfers from memory modules 320A or 320B to enable four ¼ cache line data transfers from the MC data block 340 to bus interface block 350.

The present invention provides a lockstep operational mode of memory controller system 300 that allows for ¼ cache line data transfers to be performed each memory controller clock cycle, that is at twice the frequency available in ICM mode. In the lockstep mode of operation, memory controller system 300 has memory controllers 310A and 310B 'locked' to operate in conjunction with one another. In such a mode of operation, memory modules 320A and 320B are addressed as a single contiguous address space rather than two interleaved independent address spaces and a memory transaction issued by processor 40 is conveyed to and accepted by (and synchronously executed by) both memory controllers 310A and 310B. Memory controllers 310A and 310B share a common memory address space when memory controller system 300 is configured to operate in lockstep mode. The logical mapping of memory addresses to memory modules 320A and 320B provided by the respective memory bank address tables of the memory controllers are identical when memory controller system 300 is configured to operate in lockstep mode and thus a memory transaction conveyed to each of memory controllers 310A and 310B maps to each of memory modules 320A and 320B during operation of memory controller system 300 in lockstep mode. Accordingly, a memory transaction conveyed to each of memory controllers 310A and 310B is mutually accepted and processed thereby in lockstep mode. Memory controllers 310A and 310B synchronously issue memory commands during a read (or write) transaction with respective memory modules 320A and 320B and two 144-bit data transfers are simultaneously made to MC data block 340 via buses 360A and 360B. Thus, MC data block 340 receives 288 bits during a single clock cycle and a ¼ cache line data transfer may then be prepared and performed by MC data block 340. Thus, by configuring memory controller system 300 in lockstep mode, the first data word of a cache line read may be transferred to the processor 40 via the bus interface block 350 one clock cycle earlier than is possible in ICM mode.

Figure 4B:
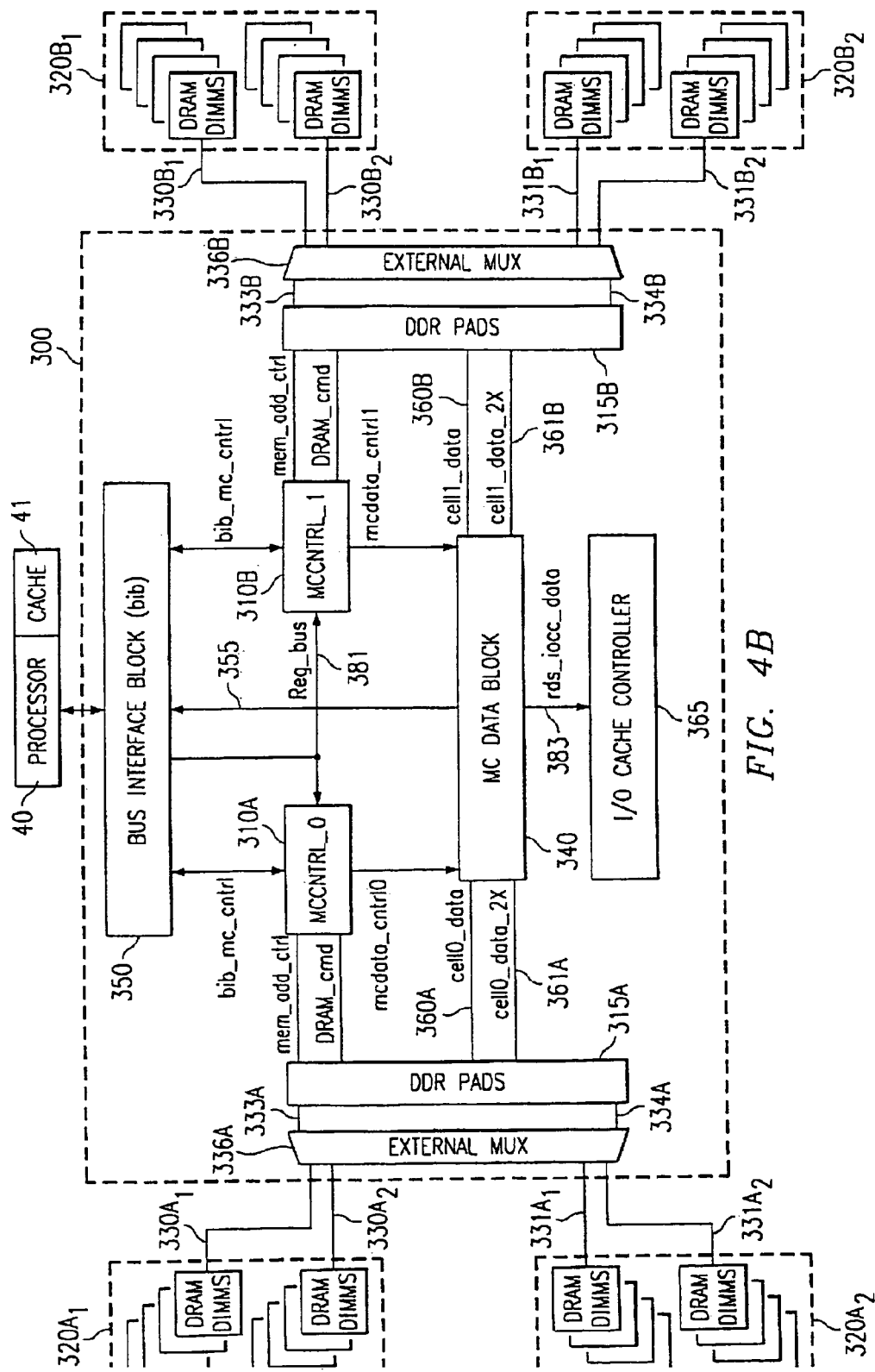
FIG. 4B is simplified schematic of the memory control system of FIG. 4A configured to operate in a mux attach mode.

With reference now to FIG. 4B, there is a simplified block diagram of memory controller system 300 configured to operate in a mux-mode of operation according to an embodiment of the present invention. In a mux-mode of operation, an intermediate chip 336A and 336B is interposed between DDR pads 315A and 315B and respective memory modules $320A_1$–$320A_2$ and $320B_1$–$320B_2$. Memory controller system 300 attaches to intermediate chip 336A and 336B via respective double-speed buses 333A–334A and 333B–334B. Each of double-speed buses 333A–334B in this embodiment is a 144-bit data bus that operates at twice the clock frequency of memory modules $320A_1$–$320B_2$. Reads and writes between DDR Pads 315A and 315B and intermediate chip 336A and 336B occur at a 2× rate. However, reads and writes between intermediate chip 336A and 336B and respective memory modules $320A_1$–$320A_2$ and $320B_1$–$320B_2$ occur at a 1× rate. For example, on a memory module $320A_1$ and $320A_2$ clock edge, 72-bit data transfers may be made over buses $330A_1$–$331A_2$. Each of buses 333A and 334A is operable to perform a 72-bit data transfer at twice the clock frequency of memory module $320A_1$ and $320A_2$. Accordingly, two 72-bit transfers may be made over double-speed bus 333A and two 72-bit transfers may be made over double-speed bus 334A during one data transfer of memory modules $320A_1$ and $320A_2$. Thus, two 144-bit transfers are made to DDR pads 315A per a common memory module $320A_1$ and $320A_2$ clock cycle. DDR pads 315A supply 144-bits (cell0_data) to bus 360A and 144-bits (cell0_data_2×) to bus 361A so that a 288-bit transfer is made to MC data block 340 per MC controller 310A clock cycle. Likewise, each of memory buses $330B_1$–$331B_2$ provides respective 72-bit data transfers to intermediate chip 336B at a 1× rate. Double-speed buses 333B and 334B each convey respective 144-bit transfers to DDR pads 315B at 2× speed so that a 144-bit (cell1_data) transfer is made to MC data block 340 via bus 360B and a 144-bit (cell1_data_2×) transfer is made to MC data block 340 via bus 361B each memory controller 310B clock cycle. Thus, independent 288-bit transfers may be made by each of memory controllers 310A and 310B on a single memory controller 310A and 310B clock cycle by using respective intermediate chip 336A and 336B to receive 1× data from memory modules $320A_1$–$320A_2$ and $320B_1$–$320B_2$ and multiplex the data at a 2× rate to MC data block 340. Additionally, memory controller system 300 is operable to have twice or quadruple the memory capacity as the configuration described with reference to FIG. 4A by using intermediate chips 336A and 336B to receive 2× data and distribute the 2× data in a 1× mode to respective memory modules $320A_1$–$320A_2$ and $320B_1$–$320B_2$. It should be understood that, in a mux-mode of operation, the memory capacity supported by memory controller system 300 is dependent on the particular implementation of intermediate chips 336A and 336B. For example, intermediate chips 336A and 336B may be designed to support various numbers of respective memory modules and, accordingly, may facilitate addressing of various memory capacities. The particular implementation of intermediate chips 336A and 336B is outside the scope of the present invention and a detailed description thereof is unnecessary for an understanding of the subject invention.

With reference now to FIG. 5, there is a diagrammatic schematic of data transfers from memory modules 320A and 320B to MC data block 340. In ICM, each of memory controllers 310A and 310B may respectively receive data during a clock cycle (MCCTRL_0 CLK and MCCTRL_1 CLK) from memory modules 320A and 320B independently of one another. In the illustrative example, memory controller 310A receives read transaction data during clock cycle MCCTRL_0 CLK 0. Memory modules 320A convey 72 bits to DDR pads 315A via memory bus 330A comprised of data lines $330A_0$–$330A_{71}$ and 72 bits to memory bus 331A comprised of data lines $330A_{72}$–$330A_{143}$ in response to a read command processed by memory controller 310A. The 72 bits transferred to DDR pads 315A by memory bus 330A and the 72 bits transferred to DDR pads 315A by memory bus 331A are passed to MC data block 340 as a 144-bit cell0_data transfer via bus 360A. Thus, a cell0_data transfer from memory modules 320A comprises a single memory controller 310A clock cycle transfer in ICM. In the illustrative example, data bits are denoted $bX(CLK)_y$ where X (0 or 1) denotes a data bit read from a memory transaction directed by memory controller 310A (MCCTRL_0) or 310B (MCCTRL_1), CLK represents the respective memory controller clock cycle, and y represents the data line of the respective memory bus 330A–331B. For example, $b0(0)_{70}$ denotes a data bit read from a read transaction directed by memory controller 310A on memory controller 310A clock cycle 0 (MCCTRL_0 CLK0) on data line $330A_{70}$ of bus 330A.

On clock cycle MCCTRL_0 CLK0, data bits $b0(0)_0$–$b0(0)_{71}$ are transferred from memory bus 330A on bus lines $330A_0$–$330A_{71}$ and data bits $b0(0)_{72}$–$b0(0)_{143}$ are transferred from memory bus 331A on signal lines $331A_0$–$331A_{71}$. A single memory controller 310A clock cycle read operation from memory modules 320A therefor comprises reading of bits $b0(0)_0$–$b0(0)_{143}$. The 144 bits read from memory modules 320A on clock cycle MCTRL_0 CLK0 are received by MC data block 340 via bus 360A. However, bus interface block 350 requires 288-bit size data transfers for performing ¼ cache line transfers and an additional data transfer from memory modules 320A must be performed. Thus, during clock cycle MCCTRL_0 CLK1, bits $b0(1)_0$–$b0(1)_{71}$ and $b0(1)_{72}$–$b0(1)_{143}$ are transferred over respective memory busses 330A and 331A to MC data block 340 via pads 315A and bus 360A. Bits $b0(0)_0$–$b0(0)_{143}$ and $b0(1)_0$–$b0(1)_{143}$ may then be transferred to bus interface block 350. Likewise, memory controller 310B may direct a read from memory modules 320B and read bits $b1(0)_0$–$b1(0)_{143}$ on clock cycle MCCTRL_1 CLK0. A subsequent clock cycle (MCCTRL_1_CLK1) issued by memory controller 310B results in an additional data transfer of 144 data bits $b1(1)_0$–$b1(1)_{143}$. MC data block 340 may then combine bits $b1(0)_0$–$b1(0)_{143}$ and bits $b1(1)_0$–$b1(1)_{143}$ for conveyance to bus interface block 350. Thus, when memory controllers 310A and 310B operate in ICM, MC data block 340 operates to buffer single clock cycle data reads directed by one of memory controllers 310A and 310B until a subsequent data transfer is made on another clock cycle of the same memory controller. After buffering and merging of two 144-bit data transfers from the same memory controller, MC data block 340 may convey a 288-bit data transfer to bus interface block 350 whereupon a ¼ cache line write to processor 40 may be made.

Memory controllers 310A and 310B conjunctively operate in coordination to address memory modules 320A and 320B when controllers 310A and 310B are in a lockstep mode of operation. In lockstep mode, memory modules 320A and 320B represent a contiguous address space rather than two distinct and separate interleaved memory address spaces (as in independent cell mode and mux-mode). Accordingly, memory transactions issued by the processor coupled with the bus interface block 350 are transferred to both memory controllers 310A and 310B and, thereafter, memory reads (or writes) to memory modules 320A and 320B are made in synchronization by memory controllers 310A and 310B. With reference again to FIG. 5, the simplified data read schematic may be representative of a data read transaction performed with memory controller system 300 operating in a lockstep mode. Note that while in lockstep mode, clocks MCCTRL_0 CLK and MCCTRL_1 CLK are synchronized. A memory transaction is first issued by processor 40 and is conveyed, accepted, and processed by both memory controllers 310A and 310B. Memory controller 310A issues a read command to memory modules 320A in synchronization with a read command issued to memory modules 320B by memory controller 310B. In response to the DRAM command, bits $b0(0)_0$–$b(0)_{143}$ are returned to MC data block 340 in synchronization with bits $b1(0)_0$–$b1(0)_{143}$ on clock cycles MCCTRL_0 CLK0 and MCCTRL_1 CLK0 respectively via buses 360A and 360B. Thereafter, a 288-bit data transfer is made from MC data block 340 to bus interface block 350 via bus 355 and a ¼ cache line data transfer comprising bits $b0(0)_0$–$b0(0)_{143}$ and $b1(0)_0$–$b1(0)_{143}$ with processor 40 may then be performed. Notably, a ¼ cache line data transfer may be performed once every memory control clock cycle in the lockstep mode of operation during which each of memory controllers 310A and 310B conjunctively issue clock signals in synchronization with one another. Thus, memory controller system 300 may perform a ¼ cache line data transfer with a one clock cycle reduction in latency from issue of the memory transaction when memory controller system 300 is configured to operate in lockstep mode rather than ICM mode.

Figure 6:
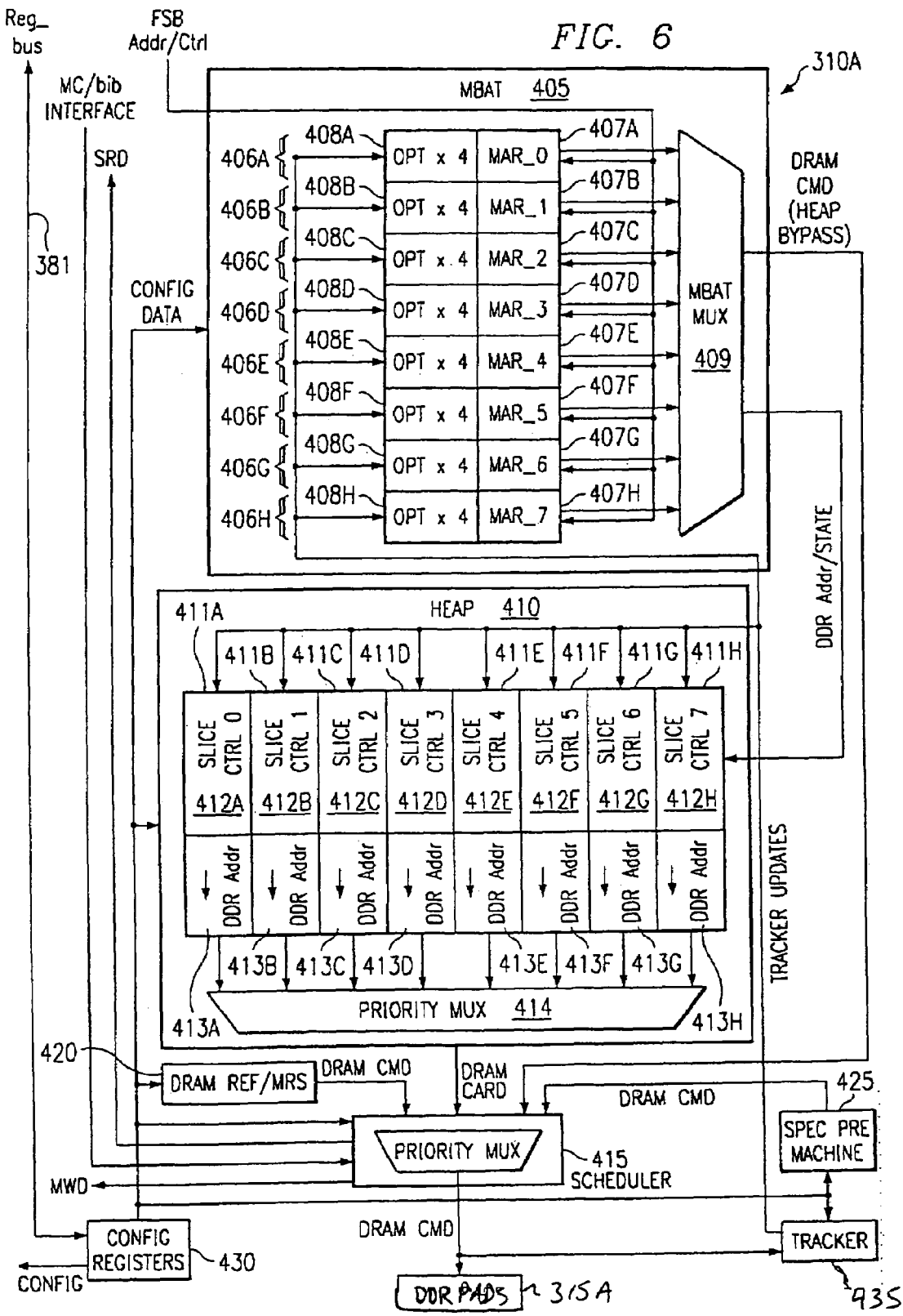
FIG. 6 is a block diagram of an embodiment of a memory controller of the present invention.

With reference now to FIG. 6, there is a simplified block diagram of memory controller 310A according to an embodiment of the present invention. Memory controller 310A comprises a memory bank address translation table (MBAT) 405 that is operable to translate a physical address of a memory transaction (FSB Addr/Ctl) into a memory address, such as a DDR address of memory module 320A. In the illustrative example, MBAT 405 comprises a plurality of memory address routing (MAR) and open page table (OPT) slices 406A–406H, each of which may have a physical address of a memory transaction applied to an input thereof. The MAR of MBAT 405 is configured to comprise a particular addressing range that maps to memory modules 320A. A valid physical address of a memory transaction submitted to MBAT 405 will be recognized by one of MARs 407A–407H as mapping into an address space provided by memory modules 320A. The physical address is then input into a memory address routing circuitry of the MAR that recognizes the physical address and outputs a DDR address, e.g. a chip select, rank, bank, row, and column. The DDR address is then input into a corresponding OPT 408A–408H that evaluates a memory page state, e.g. open or closed, of the DDR address. MBAT 405 then derives a DRAM command (DRAM_cmd) from the DDR address and state data. The DDR address and state data as well as the DRAM command derived therefrom are output by MBAT circuitry, for example an MBAT multiplexer 409, and respectively applied to a source input of a heap 410 and a scheduler 415. An invalid physical address of a memory transaction submitted to MBAT 405, e.g. a physical address outside of the addressing range of MBAT 405, is not recognized by any of MARs 407A–407H. Accordingly, a memory transaction submitted to MBAT 405 having an invalid physical address is not accepted nor processed by memory controller 310A. Memory controller 310B comprises an MBAT having similar functionalities and capabilities as that described with reference to MBAT 405. Thus, each MAR slice of the MBAT of memory controller 310A will have a common memory mapping range as a MAR slice of the MBAT of memory controller 310B when the memory controller system 300 is configured to operate in the lockstep mode as enabled by the present invention. As mentioned hereinabove, the logical mapping of memory addresses to memory modules 320A and 320B provided by the respective memory bank address tables are mutually exclusive when memory controller system 300 is configured to operate in ICM or mux-mode and are identical when memory controller system 300 is configured to operate in lockstep mode. A memory transaction conveyed to each of memory controllers 310A and 310B may have a physical address recognized as valid by only one of the MBATs of memory controllers 310A and 310B and thus may only map to one of memory modules 320A and 320B during operation of memory controller system 300 in ICM and mux-mode. Accordingly, a valid memory transaction is accepted and processed by one of memory controllers 310A and 310B when memory controller system 300 is configured to operate in either ICM or mux-mode. A memory transaction having a valid physical address conveyed to each of memory controllers 310A and 310B will be recognized as valid by both respective MBATs and accordingly maps to each of memory modules 320A and 320B when memory controller system 300 operates in lockstep mode and the memory transaction is thereafter processed by both memory controllers 310A and 310B.

Heap 410 comprises a plurality of slices 411A–411H in a serial-in parallel-out shift register configuration. Each heap slice 411A–411H respectively comprises a control slice 412A–412H and an associated address slice 413A–413H. Heap 410 provides an intrinsic memory transaction 'aging' mechanism by shifting any succeeding memory transactions down heap 410 when a slice 411A–411H is vacated, that is when a memory transaction is output to a scheduler 415 from a slice of heap 410. For example, if a memory transaction maintained in slice 411C is output from heap 410, any memory transactions maintained in slices 411D–411H succeeding slice 441C are shifted down to an adjacent slice lower in the heap hierarchy. Thus, a memory transaction maintained at a lower slice of heap 410 than another memory transaction has necessarily been loaded in heap 410 for a longer period of time. This memory transaction 'age' may be considered when multiple memory transactions are maintained in heap 410 awaiting output and execution. All memory transactions maintained in heap 410 are supplied to a source input of a priority multiplexer 414. On each clock cycle, priority multiplexer 414 may consider any number of control inputs, such as a memory transaction age and other factors, in determining which memory transaction to output (in the form of a DRAM command (DRAM_cmd) derived from the DDR address and state data) to scheduler 415. Other factors that may be considered by priority multiplexer 414 in determining which memory transaction to output when multiple memory transactions are applied to multiplexer 414 as source inputs include the addressed page state of the memory transaction and the type (read or write) of the memory transaction.

DRAM commands may be conveyed to scheduler 415 by other controller systems, including a DRAM refresh/mode register set (DRAM Ref/MRS) 420 and a speculative precharge machine 425 in addition to the DRAM commands that may be sourced by MBAT 405 and heap 410. Scheduler 415 is preferably implemented as a priority multiplexer and selects a source for output on priorities assigned to the respective sources. A DRAM command issued by DRAM Ref/MRS 420 is assigned the highest priority and is selected before any other DRAM command applied to a source input of scheduler 415. Commands issued by DRAM Ref/MRS 420 may include a refresh command and configuration settings for memory modules 320A. A DRAM command issued by heap 410 is assigned the second highest priority and a DRAM command issued by heap 410 is selected for output by scheduler 415 in any event that no DRAM command is supplied by DRAM Ref/MRS 420. Next, the heap bypass, that is the DRAM command applied to a source input of scheduler 415 directly from MBAT 405, has the third priority assigned thereto and a DRAM command supplied at an input of scheduler 415 by MBAT 405 is selected for output only when no DRAM commands are currently supplied by DRAM Ref/MRS 420 or heap 410. A lowest priority for a scheduler 415 source is assigned to a DRAM command issued by a speculative precharge machine 425 that is operable to monitor the duration that memory pages have been opened in modules 420A. Speculative precharge machine 425 monitors memory module 420A configuration parameters and may issue DRAM commands, such as memory page close commands, for open pages that have not recently been addressed for read or write transactions. A DRAM command issued by speculative precharge machine 425 to a source input of scheduler 415 is only selected for output if no other command sources, i.e. DRAM Ref/MRS 420, heap 410 or MBAT 405, have supplied a command to scheduler 415. Scheduler 415 outputs the selected DRAM command to DDR pads 315A where the memory transaction is conveyed to memory modules 320A.

A Tracker block 435 monitors the output of the scheduler 415 and informs MBAT 405 and heap 410 which of the possible transactions sourced to scheduler 415 was selected for submission to memory modules 320A. MBAT 405 and heap 410 may then update respective transaction and page state information maintained thereby based on the output (tracker update) from tracker 435. For example, heap 410 may shift any transaction succeeding the selected transaction maintained thereby down a slice 411A–411H upon receipt of the tracker update. MBAT 405 may update page state information of an appropriate OPT 408A–408H of the slice 406A–406H from which the selected transaction was generated.

A configuration registers set 430 contains system configuration registers that are firmware writeable. Configuration register set 430, and associated outputs thereof, select and maintain proper modal behaviors and timing parameters associated with the operational modes supported by memory controller system 300 by, for example, distributing configuration data to one or more logic components of memory controller 310A at boot up of a computer system featuring memory controller system 300. Configuration register set 430 supplies timing parameters and/or other configuration data (Config_data) to various logic components, e.g. tracker 435, scheduler 415, DRAM Ref/MRS 420, heap 410, and MBAT 405, that configure the respective logic components for proper operation according to the operational mode, i.e. ICM, mux-mode, or lockstep mode, of memory controller system 300.

It is understood that memory controller 310B comprises similar functional blocks in a similar configuration as those described with reference to memory controller 310A of FIG. 6.

The system configuration bus 381 is coupled with the configuration register sets of both memory controllers 310A and 310B and is operable to distribute configuration read and write commands thereto. Memory controller system 300 may be configured to operate in any one of the described ICM, mux, and lockstep modes by setting the respective configuration register sets of memory controllers 310A and 310B in an associated logic state that defines respective memory controller 310A and 310B operational mode behaviors. Thus, each of three logic states of respective configuration register sets of memory controllers 310A and 310B define the operational behaviors of the memory controllers in one of ICM, mux, and lockstep modes of memory controller system 300. The logic states of the respective configuration register sets of memory controllers 310A and 310B is identical in lockstep mode and, accordingly, distribution of timing parameters and other component behavior logic of memory controllers 310A and 310B by the respective configuration register sets comprises distribution of identical sets of timing and configuration parameters to corresponding components, e.g. MBATs, heaps, trackers, schedulers, and other subunits, of both memory controllers 310A and 310B when memory controller system 300 is in lockstep mode. For example, MAR slices of MBATs of both memory controllers 310A and 310B have identical timing and configuration data delivered thereto by respective configuration register sets during a system boot routine in a computer system employing memory controller system 300 configured to operate in lockstep mode. Thus, MAR slices of both memory controllers 310A and 310B are identically configured and provide identical address mappings to respective memory modules 320A and 320B. In a preferred embodiment, reconfiguration of memory controller system 300 is performed by a firmware write made to respective configuration register sets of memory controllers 310A and 310B. A firmware unit, such as an electrically erasable programmable read only memory, may provide processor 40 with firmware code that is conveyed to bus interface block 350 and transferred therefrom to each of the respective configuration register sets of memory controllers 310A and 310B.

System configuration bus 381 has a protocol associated therewith that defines bus 381 operation and which may implement logic behavior of the system configuration bus 381. System configuration bus 381 may have a protocol controller associated therewith for facilitating proper processing and encoding of configuration transactions performed thereby. A programmable lockstep register may be included within memory controller 310A or 310B that may have a bit value, or bit field values, written thereto that is interpreted by the system configuration bus 381 protocol controller as indicating operational mode selection of lockstep mode. Thereafter, the protocol controller of the system configuration bus implements configuration register instruction sets, such that any register write to a register of configuration register set 430 of memory controller 310A is additionally written into the corresponding register of the configuration register set of memory controller 310B. Moreover, any register write addressed to a register of the configuration registers set of memory controller 310B is ignored, or discarded, by the protocol controller of system configuration bus 381. Preferably, reads from both configuration register sets of memory controllers 310A and 310B are unaffected such that firmware code delivered to both configuration register sets may be read therefrom, e.g. as may be performed during a memory controller system 300 re-configuration verification routine. Thus, by directing any programmable state data addressed to registers of configuration registers set 430 to corresponding registers of the configuration register set of memory controller 310B, a common logic state of both configuration register sets of memory controllers 310A and 310B is obtained, and a common logic and operational state is provided to memory controllers 310A and 310B upon delivery of the configuration data to the respective components thereof. Operation of memory controller system 300 in one of ICM, mux-mode, or lockstep mode therefor corresponds to one of three general logic states of respective configuration register sets of memory controllers 310A and 310B and the modality of memory control system 300 is fully firmware selectable.

Figure 7:
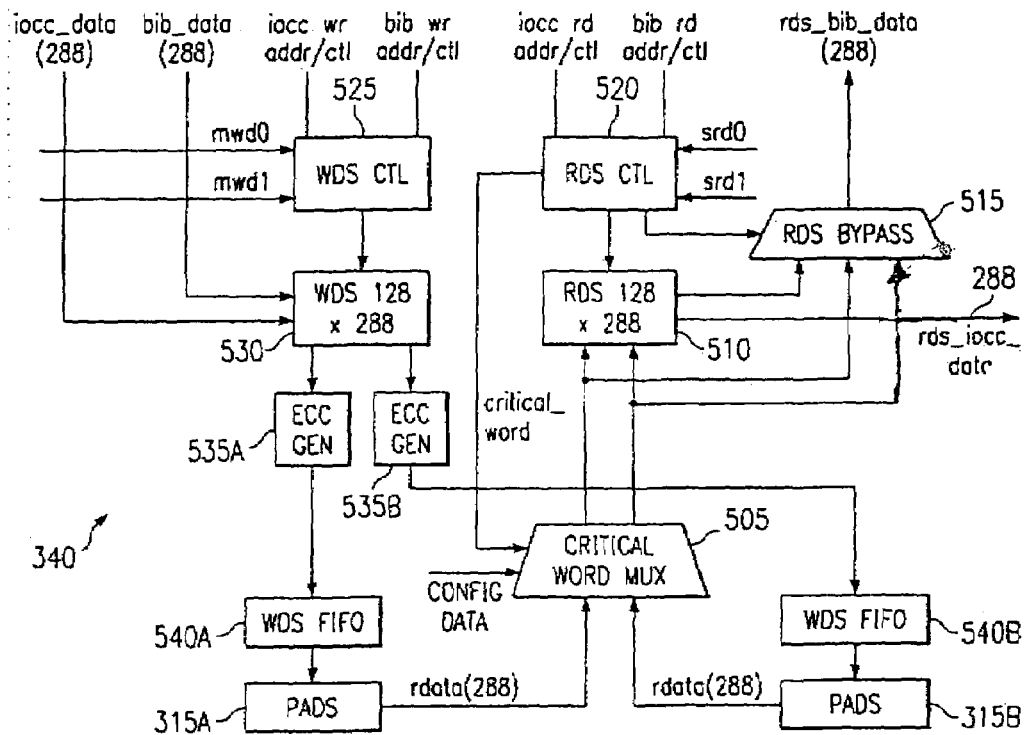
FIG. 7 is a block diagram of an embodiment of a memory controller data block of the memory controller system described with reference to FIG. 4 according to the present invention.

With reference now to FIG. 7, there is a block diagram of MC data block 340 of memory controller system 300 according to an embodiment of the present invention. MC data block 340 comprises a critical word multiplexer 505 having DDR pads 315A and 315B interconnected therewith. Each of pads 315A and pads 315B may supply read data (rdata) from respective memory modules 320A and 320B in groups of 288-bit data words comprised of two individual 144-bit transfers as source data to critical word multiplexer 505. Configuration register set 430 applies configuration data (Config_data) indicating the current operating mode of memory controller system 300 to a select input of a critical word multiplexer 505. Critical word information (critical_word) information is applied to the select input of critical word multiplexer 505 as well. As is understood in the art, the critical word data is specified in a physical address of a memory access request and specifies a structured order for the requested data. Critical word multiplexer 505 selects an output of source data according to an operational mode and critical word order as specified by the configuration data and critical word information applied to the select input thereof as described more fully hereinbelow with reference to FIG. 8. Read data applied to a source of critical word multiplexer 505 is output to a fully-addressable read data storage (RDS) 510 and a RDS bypass multiplexer 515. In the illustrative example, RDS 510 has capacity for storing 128 ¼ cache line data words. An RDS controller (RDS CTL) 520 is coupled with both RDS 510 and RDS bypass multiplexer 515 and is operable to select read data from either RDS 510 or RDS bypass multiplexer 515 to be conveyed to bus interface block 350 by asserting a control signal to one of RDS 510 and RDS bypass multiplexer 515. RDS CTL 520 may receive address and control signals from both IOCC 365 and bus interface block 350 (respectively designated as iocc_rd_addr/ct1 and bib_rd_addr/ctl). Additionally, a store read data (SRD) signal is applied to RDS CTL 520 to initiate a read data return procedure that indicates to RDS CTL 520 that data addressed by a bus interface read address (or alternatively an IOCC read address) will be valid in a pre-determined number of succeeding clock cycles. An SRD is issued by memory controller 310A or 310B controlling the data transfer. That is, read data conveyed from memory modules 320A is returned to MC data block 340 in a procedure initiated by an SRD provided to RDS CTL 520 by scheduler 415 (of memory controller 310A). Likewise, read data conveyed from memory modules 320B is returned to MC data block 340 in a procedure initiated by an SRD provided to RDS CTL 520 by the scheduler of memory controller 310B. In the illustrative example of FIG. 7, an SRD issued by memory controller 310A is designated srd0 and an SRD issued by memory controller 310B is designated srd1. When memory controller system 300 operates in either ICM or mux-mode, srd0 and srd1 are issued independently of one another and when memory controller system 300 operates in lockstep mode, srd0 and srd1 are issued in synchronization. The source of the read address and control data supplied to RDS CTL 520 determines the destination of the read data and, accordingly, the control signal applied to RDS 510 by RDS CTL 520 causes read data to be output to either RDS bypass multiplexer 515, in which case the read data is ultimately delivered to bus interface block 350 (designated as rds_bib_data), or to IOCC 365 (designated as rds_iocc_data).

MC data block 340 additionally comprises circuitry for performing write operations to modules 320A and 320B. A write data storage (WDS) controller 525 is interconnected with a fully addressable WDS 530 and issues write address and control commands thereto. WDS 530 is operable to store 128 ¼ cache line data words thereto and may receive data from IOCC 365 (denoted as iocc_data) and bus interface block 350 (denoted bib_data). Write commands may be issued to WDS by IOCC 365 (denoted iocc_wr_addr/ctl) and by bus interface block 350 (denoted bib_wr_addr/ctl) on behalf of processor 40. A write to memory modules 320A and/or 320B is initiated by memory controller 310A and/or 310B by issue of a move write data (MWD) command. When operating in ICM or mux-mode, memory controller 310A initiates a write from WDS 525 to memory modules 320A by issue of mwd0 to WDS CTL 525. Likewise, memory controller 310B initiates a write from WDS 525 to memory modules 320B by issue of mwd1 to WDS CTL 525. When memory controller system 300 operates in lockstep mode, a write to memory modules 320A and 320B is initiated by a synchronized issue of mwd0 and mwd1 by respective memory controllers 310A and 310B. Write data output by WDS 530 may be made to error correction circuits (ECCs) 535A and 535B each coupled with a respective WDS FIFO 540A and 540B. WDS FIFOs 540A and 540B are, in turn, respectively coupled with pads 315A and pads 315B. Output data (denoted data) written to WDS FIFOs 540A and 540B is thereafter written to respective memory modules 320A and 320B.

Figure 8:
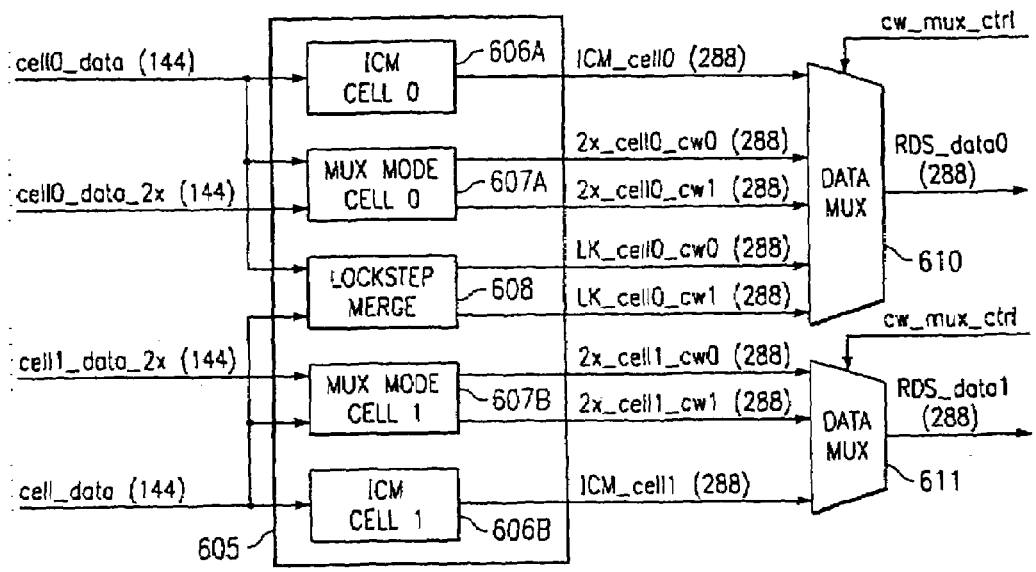
FIG. 8 is a block diagram of an embodiment of a critical word multiplexer that facilitates multi-modal operation of the memory controller system described with reference to FIG. 4 according to the present invention.

With reference now to FIG. 8, there is a block diagram of critical word multiplexer 505 that facilitates multi-modal operation of memory controller system 300 according to an embodiment of the present invention. Critical word multiplexer 505 comprises an alignment and merge block 605 and multiplexer circuits 610 and 611. Alignment and merge block 605 comprises alignment and merge circuits 606A and 606B operable to perform ECC bit alignment and data merge operations on data read from respective memory modules 320A and 320B while memory controller system 300 is operated in ICM. Accordingly, alignment and merge circuits 606A and 606B have only data read from respective buses 360A and 360B input thereto. Alignment and merge block 605 also comprises 2× mode alignment and merge circuits 607A and 607B operable to perform ECC bit alignment and data merge operations on data read from respective memory modules 320A and 320B when memory controller system 300 operates in mux-mode. Thus, data read from buses 360A and 361A are supplied to an input of 2× alignment and merge circuit 607A and data read from buses 360B and 361B are supplied to an input of 2× alignment and merge circuit 607B. Additionally, when memory controller system 300 operates in lockstep mode, all data transfers from memory modules 320A and 320B to MC data block 340 are made over respective buses 360A and 360B and, accordingly, both buses 360A and 360B are coupled with an input to a lockstep alignment and merge circuit 608.

Each of alignment and merge circuits 606A, 607A, and 608 have respective outputs thereof applied as separate data source inputs to multiplexer 610. Likewise, alignment and merge circuits 606B and 607B have outputs thereof applied to a source input of multiplexer 611. Alignment and merge circuit 608 merges data received from both buses 360A and 360B and, accordingly, the output thereof is commonly applied to multiplexer 610.

Alignment and merge circuit 606A receives 144-bit data transfers exclusively from bus 360A. As noted hereinabove, RDS 510 receives data in 288-bit transfers. Thus, alignment and merge circuit 606A buffers data received by MC data block 340 on adjacent memory controller 310A clock cycles and outputs 288-bit ICM data transfers (ICM_cell0) read from memory modules 320A to a source input of multiplexer 610. Likewise, alignment and merge circuit 606B receives 144-bit data transfers exclusively from bus 360B and buffers data received by MC data block 340 on adjacent memory controller 310B clock cycles. Output of alignment and merge circuit 606B is applied to a source input of multiplexer 611 as 288-bit ICM data transfer (ICM_cell1).

Alignment and merge circuit 607A receives 144-bit inputs (cell0_data and cell0_data_2x) from buses 360A and 361A received by MC data block 340 on a common memory controller 310A clock cycle and merges the two 144-bit transfers into two 288-bit outputs (2x_cell0_cw0 and 2x_cell0_cw1) that are respectively applied to a source input of multiplexer 610. Outputs 2x_cell0_cw0 and 2x_cell0_cw1 represent the two possible critical word orders that may be requested by processor 40 for the read data supplied by memory modules $320A_1$ and $320A_2$ associated with buses 360A and bus 361A when memory controller system 300 operates in mux-mode. Similarly, alignment and merge circuit 607B receives two 144-bit inputs (cell1_data and cell1_data_2x) from buses 360B and 361B received by MC data block 340 on a common memory controller 310B clock cycle and merges the two 144-bit transfers into two 288-bit outputs (2x_cell1_cw0 and 2x_cell1_cw1) that are respectively applied to a source input of multiplexer 611. 2x_cell1_cw0 and 2x_cell1_cw1 represent the two possible critical word orders that may be requested by processor 40 for the read data supplied by memory modules $320B_1$ and $320B_2$ associated with buses 360B and 361B when memory controller system 300 operates in mux-mode.

Alignment and merge circuit 608 receives a 144-bit input (cell0_data) from bus 360A and a 144-bit input (cell1_data) from bus 360B and merges the two 144-bit transfers into two 288-bit lockstep data words (LK_cell0_cw0 and LK_cell0_cw1) that are respectively applied to a source input of multiplexer 610. Outputs LK_cell0_cw0 and LK_cell0_cw1 represent the two possible critical word orders that may be requested by processor 40 for the read data supplied by memory modules 320A and 320B associated with buses 360A and 360B when memory controller system 300 operates in lockstep mode.

A critical word multiplexer control signal (cw_mux_ctrl) comprised of a lockstep indicator bit, a 2x mode indicator bit derived from the Config registers 430, and a critical word field (critical_word) sourced by RDS controller 520 is applied to respective select inputs of multiplexes 610 and 611. A lockstep indicator bit of cw_mux_ctrl may be set to one of two states, that is the lockstep bit may be asserted or unasserted. An asserted lockstep bit state preferably indicates that memory controller system 300 is in a lockstep mode and, accordingly, when asserted selects one of sources LK_cell0_cw1 or LK_cell0_cw1 for output by multiplexer 610. In a similar manner, the 2x mode indicator bit of cw_mux_ctrl may be set to one of two states and an asserted 2x mode bit preferably indicates that memory controller system 300 is operating in mux-mode. Accordingly, an asserted 2x mode indicator bit selects one of 2x_cell0_cw0 and 2x_cell0_cw1 for output by multiplexer 610 and one of 2x_cell1_cw0 and 2x_cell1_cw1 for output by multiplexer 611. The critical word field of cw_mux_ctrl preferably comprises two bits, each associated with a respective memory controller 310A and 310B and each having one of two states (0 or 1) and selects one of two outputs of respective alignment and merge circuits 607A, 607B, and 608 when memory controller system 300 operates in either mux-mode or lockstep mode. Thus, cw_mux_ctrl is applied to a source select of multiplexer 610 for selecting one of the source inputs of multiplexer 610 for output thereby as RDS_data0 and one of the source inputs of multiplexer 611 for output thereby as RDS_data1. When memory controller system 300 is operated in ICM, cw_mux_ctrl is set to select ICM_cell0 and ICM_cell1 as respective outputs (RDS_data0 and RDS_data1) to be conveyed to RDS 510. As described hereinabove, each of memory controllers 310A and 310B may direct a ¼ cache line data word every other respective memory controller clock cycle and, thus, RDS_data0 and RDS_data1 may be output from multiplexes 610 and 611 every other respective memory controller 310A and 310B clock cycle when memory controller system 300 is configured to operate in ICM mode. When memory controller system 300 is operated in 2x mux-mode, cw_mux_ctrl is set to select either 2x_cell0_cw0 or 2x_cell0_cw1 as output ($RDS_{13}$ data0) from multiplexer 610 and either 2x_cell1_cw0 or 2x_cell1_cw1 as output from multiplexer 611. In 2x mux-mode, RDS_data0 may be output each memory controller 310A clock cycle and RDS_data1 may be output each memory controller 310B clock cycle. In lockstep mode, cw_mux_ctrl is set to select either LK_cell0_cw0 or LK_cell0_cw1 as output (RDS_data0) from multiplexer 610 and to disable, or otherwise ignore, any output from multiplexer 611. RDS_data0 may be output each synchronized memory controller 310A and 310B clock cycle in lockstep mode as provided in a preferred embodiment of the present invention.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A memory controller system for processing memory access requests, comprising:
  a first memory controller operable to address a first plurality of memory modules; a second memory controller operable to address a second plurality of memory modules, the first and second memory controllers configurable to process a memory transaction in a plurality of different operational modes, the plurality of different operational modes comprising an independent cell mode, a multiplexer-mode (mux-mode), and a lockstep mode.

2. The memory controller system according to claim 1, further comprising a bus interface block operable to convey the memory transaction to both of the first and second memory controllers.

3. The memory controller system according to claim 1, wherein the memory transaction is accepted and processed by one of the first and second memory controllers.

4. The memory controller system according to claim 1, wherein the first and second memory controllers each comprise a memory bank address table operable to map a physical address to, and maintain page state data of, a memory space provided by the respective first and second plurality of memory modules.

5. The memory controller system according to claim 4, wherein when the memory controller system is configured to operate in one of the independent cell mode and the mux-mode, the memory transaction is accepted by one of the memory bank address tables.

6. The memory controller system according to claim 1, wherein a quarter-cache line data transfer is performed with a one-clock cycle reduction in latency when the memory controller system is configured to operate in the lockstep mode than operably possible when configured to operate in the independent cell mode.

7. The memory controller system according to claim 1, wherein the first and second memory controllers each comprise a heap operable to maintain a plurality of memory transactions therein.

8. The memory controller system according to claim 1, wherein the first and second memory controllers comprise a scheduler operable to receive a memory command, the scheduler operable to output the memory command to its respective plurality of memory modules.

9. The memory controller system according to claim 1, wherein when the memory controller system is configured to operate in the lockstep mode, the memory transaction is accepted by a memory bank address table disposed in each of the first and second memory controllers.

10. The memory controller system according to claim 1, wherein when the memory controller system is configured to operate in the lockstep mode, a scheduler in each of the first and second memory controllers outputs a memory command in synchronization to their respective plurality of memory modules.

11. The memory controller system according to claim 1, wherein the first and second memory controllers each comprise a configuration register set that is firmware writeable.

12. The memory controller system according to claim 11, wherein the operational mode of the memory controller system is selected dependent on a respective logic state of the configuration register set.

13. The memory controller system according to claim 1, further comprising:
a read data storage operable to store a plurality of data transfers from each of the first and second plurality of memory modules; and
a memory control data block comprising a critical word multiplexer operable to receive read data from the first and second plurality of memory modules and convey the read data to the read data storage.

14. The memory controller system according to claim 13, wherein the critical word multiplexer conveys the read data to the read data storage in one of a plurality of formats selectable by a critical word multiplexer control signal applied to a select input thereof.

15. The memory controller system according to claim 14, wherein the critical word multiplexer includes a bit indicative of the mux-mode operational state, a bit indicative of the lockstep mode, and a bit field indicative of a critical word order.

16. The memory controller system according to claim 13, wherein the critical word multiplexer is operable to perform alignment and merge operations on the read data prior to conveyance of the data to the read data storage.

17. The memory controller system according to claim 13, wherein the critical word multiplexer is operable to merge read data from the first plurality of memory modules with read data from the second plurality of memory modules when the memory controller system is configured to operate in the lockstep mode.

18. The memory controller system according to claim 17, wherein the merged data comprises the smallest read data transfer size that may be made between the read data storage and the bus interface block, conveyance of the merged data occurring on a single clock cycle.

19. A method of processing a memory access request in a memory controller system, comprising:
receiving, by the memory control system, a memory transaction;
conveying the memory transaction to each of a first memory controller and a second memory controller; and
configuring the first and second memory controllers to process the memory transaction in one of a plurality of different operational modes, the plurality of different operational modes comprising an independent cell mode, a multiplexer-mode (mux-mode), and a lockstep mode.

20. The method according to claim 19, further comprising accepting, by a memory bank address table of one of the first and second memory controllers, the memory transaction when operating in one of the independent cell mode and the mux-mode.

21. The method according to claim 19, further comprising accepting, by a memory bank address table of both the first and second memory controllers, the memory transaction when operating in the lockstep mode.

22. The method according to claim 19, further comprising transferring configuration data to at least one of the first and second memory controllers indicating the operational mode.

23. A memory controller system for processing memory access requests, comprising:
a first controller means operable to address a first plurality of memory modules;
a second controller means to address a second plurality of memory modules, the first and second controller means configurable to process a memory transaction in a plurality of different operational modes, the plurality of different operational modes comprising an independent cell mode, a multiplexer-mode (mux-mode), and a lockstep mode.

24. The memory controller system according to claim 23, further comprising means for conveying the memory transaction to both of the first and second controller means.

25. The memory controller system according to claim 23, wherein the first and second controller means each comprise a means for mapping a physical address to, and maintaining page state data of, a memory space provided by the respective first and second plurality of memory modules.

26. The memory controller system according to claim 23, wherein the first and second controller means each comprise a means for receiving a memory command, the receiving means operable to output the memory command to its respective plurality of memory modules.

* * * * *